May 19, 1953   W. A. DANIELS   2,639,039
SUPPORT FOR ICE-CREAM CONTAINERS AND THE LIKE
Filed Dec. 17, 1948
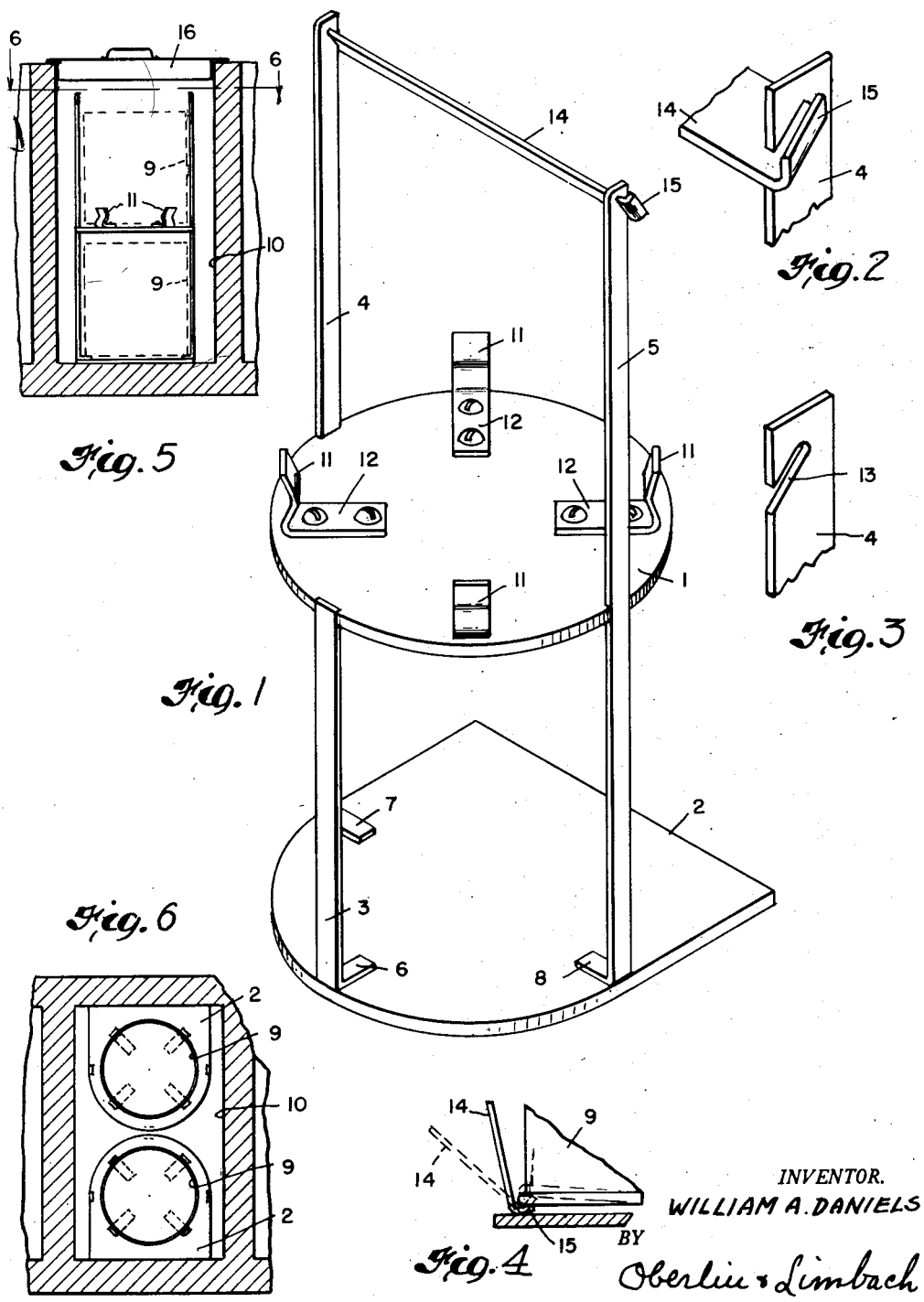
INVENTOR.
WILLIAM A. DANIELS
BY
Oberlin & Limbach
ATTORNEYS.

Patented May 19, 1953

2,639,039

UNITED STATES PATENT OFFICE 2,639,039

SUPPORT FOR ICE-CREAM CONTAINERS AND THE LIKE

William A. Daniels, Seven Hills Village, Ohio

Application December 17, 1948, Serial No. 65,781

2 Claims. (Cl. 211—71)

The present invention relates generally as indicated to a support for ice cream containers and the like and constitutes further improvements in a support or stabilizer such as disclosed in my co-pending application Serial No. 27,042, filed May 14, 1948, whereby to greatly facilitate handling of the containers and scooping of the ice cream therefrom.

At present, ice cream for dispensing in bulk at soda fountains, for example, is generally packed in standard 2½ gallon disposable paper or like containers of cylindrical form and of height somewhat less than one-half the depth of the usual freezing equipment thereby necessitating either stacking the containers to utilize most of the freezing space and to provide convenient access to the contents of the top containers, or of providing make-shift devices to support the containers in elevated position, such latter expedient resulting in a loss of valuable freezing space. In either event, the scooping of the ice cream from such containers is a two-hand operation requiring one hand to manipulate the scooping implement and the other hand to hold the container against tipping, rotating, and shifting laterally within the freezing compartment. Furthermore, where the containers are superimposed or stacked as aforesaid, the lifting thereof from the freezing compartment is quite difficult because of the relatively small space between the container and the side walls of the compartment.

With the present improvements it is proposed to eliminate the aforesaid and other difficulties and thereby render much more convenient the use of such paper containers and without loss or waste of storage space in the freezing unit.

Accordingly, it is one primary object of this invention to provide a support which is adapted to relatively immovably support one container thereon in an elevated position for free access and to support another container beneath said elevated container.

Another object is to provide a support which, together with the two containers thereon, is readily liftable from the freezing unit.

Another object is to provide a support having a handle which is detachable from the support so as not to interfere with the dispensing of ice cream from the elevated container and which is readily attachable to the support to enable lifting and lowering of the support and containers from and into the freezing unit, said handle being formed so as to function as a pry to free the containers from the support.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a perspective view of one embodiment of the present invention;

Figs. 2 and 3 are fragmentary perspective views of the upper end of the support with and without the detachable handle mounted thereon;

Fig. 4 is a fragmentary elevation view illustrating one manner of using the detachable handle as a pry for freeing the containers from the support;

Fig. 5 is a vertical cross-section view through a typical freezing unit with the support therein; and Fig. 6 is a horizontal cross-section view taken substantially along the plane indicated by the line 6—6, Fig. 5.

As best illustrated in Fig. 1, the support comprises spaced upper and lower plates 1 and 2 preferably fabricated from relatively heavy gauge steel on the order of ¼" thick. Said plates 1 and 2 are secured in spaced relation as by the circularly arranged upwardly extending members 3, 4, and 5 which are attached to said plates as by welding, riveting, or other convenient means, said members 4 and 5 being diametrically opposed and extending upwardly above the upper plate 1. Preferably, the lower ends of said members 3, 4, and 5 are respectively provided with inwardly extending foot portions 6, 7, and 8 whereby a container 9 (see Figs. 4 and 5) is adapted to be supported on lower plate 2 in a slightly raised position so as to enable insertion of a prying tool thereunder. Furthermore, because the area of such feet in contact with the bottom of the container is relatively small, the container even though frozen to the support may be relatively easily broken free therefrom.

As shown, said plate 2 is of non-circular contour so that the support as a whole will be non-rotatable within the freezing compartment 10 and is of a size such that when the requisite number of supports are fitted into the freezing compartment 10, as shown in Fig. 6, each support will be precluded from objectionable lateral or rotative movement therein.

The upper plate 1 is preferably of circular contour as shown and has secured to its upper face a plurality of circularly arranged resilient upstanding fingers 11 adapted to engage the sides of a container 9 placed on said plate and thereby laterally retain the container on the support. Said fingers 11 preferably frictionally engage the side wall of the container so as to resist rotation of the container relative to the support and to hold the container against tipping relative to the support. Said fingers 11 are also provided with inwardly extending feet 12 which support the container in a slightly raised position above said plate 1 for the same purpose as previously mentioned in connection with the foot portions 6, 7, and 8 of the members 3, 4, and 5.

As best shown in Figs. 2 and 3, the upper ends of the members 4 and 5 are each formed with an upwardly inclined slot 13 open at its lower end, said slots being formed to removably receive therein a handle 14 by which the support together with the containers thereon may be lifted from and lowered into the freezing compartment 10. The ends of said handle 14 are bent transversely as at 15 to preclude inadvertent longitudinal disengagement of the handle from the slots 13 and also to render the handle usable as a pry for insertion under either of the containers for prying the same loose from the support in a manner clearly illustrated in Fig. 4. As previously indicated, because the bottoms of the containers 9 are only in contact with the relatively small areas of the inwardly extending portions 6, 7, and 8 of the members 3, 4, and 5 or with the relatively small areas of the inwardly extending portions 12 of the fingers 11, the containers may be readily freed by such prying.

With a support such as herein disclosed it can be seen from Fig. 5 that it is a relatively simple matter to raise the freezing unit lid 16 and scoop the ice cream from the upper container 9. As shown in Fig. 5, the detachment of the handle 14 provides free access to the upper container and, of course, the support serves to hold such upper container relatively fixed against rotating, laterally shifting and tipping within the freezing compartment 10 whereby manipulation of the scooping implement with one hand leaves the other hand free for holding the cone or cup into which the scooped ice cream is to be deposited.

Other modes of applying the principle of the invention may be employed, change being made as regards the details described, provided the features stated in any of the following claims, or the equivalent of such, be employed.

I therefore particularly point out and distinctly claim as my invention:

1. A device for supporting bulk ice cream containers in a freezing cabinet comprising spaced, upper and lower shelves each adapted to support a container thereon, and the lower shelf adapted to non-rotatably fit within a freezing compartment and serve as a supporting base for the entire device; vertical members between said shelves fixedly securing said shelves in spaced relation; a pair of said members diametrically opposed extending upwardly above said upper shelf, said pair of members each provided at its upper end with an upwardly inclined slot open at the lower end, and a flat pry bar having its opposite ends removably fitted into such slots, said flat pry bar having transversely bent ends beyond said pair of members for longitudinally retaining said bar in engagement with such slots.

2. A device for supporting bulk ice cream containers in a freezing cabinet comprising spaced, upper and lower shelves each adapted to support a container thereon, and the lower shelf adapted to serve as a supporting base for the entire device; vertical members between said shelves fixedly securing said shelves in spaced relation; a pair of said members diametrically opposed extending upwardly above said upper shelf, said pair of members each provided at its upper end with an upwardly inclined slot open at the lower end, and a flat pry bar having its opposite ends removably fitted into such slots, said flat pry bar having transversely bent ends beyond said pair of members for longitudinally retaining said bar in engagement with such slots.

WILLIAM A. DANIELS.

References Cited in the file of this patent

UNITED STATES PATENTS

| Number | Name | Date |
|---|---|---|
| 881,543 | Cole | Mar. 10, 1908 |
| 899,031 | Davis | Sept. 22, 1908 |
| 1,583,295 | Larsen | May 4, 1926 |
| 1,655,744 | Swanby | Jan. 10, 1928 |
| 1,739,588 | Greene | Dec. 17, 1929 |
| 1,897,905 | Johnson | Feb. 14, 1933 |
| 2,150,784 | Roehm | Mar. 14, 1939 |
| 2,451,884 | Stelzer | Oct. 19, 1948 |